US011339613B2

(12) United States Patent
Thomas et al.

(10) Patent No.: US 11,339,613 B2
(45) Date of Patent: May 24, 2022

(54) COMPOSITE CABLES

(71) Applicant: Halliburton Energy Services, Inc., Houston, TX (US)

(72) Inventors: Sean Gregory Thomas, Allen, TX (US); Michael Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 49 days.

(21) Appl. No.: 16/985,981

(22) Filed: Aug. 5, 2020

(65) Prior Publication Data

US 2020/0362644 A1    Nov. 19, 2020

Related U.S. Application Data

(62) Division of application No. 15/119,935, filed as application No. PCT/US2014/035840 on Apr. 29, 2014, now Pat. No. 10,767,421.

(51) Int. Cl.
*E21B 17/00* (2006.01)
*C08K 3/08* (2006.01)
(Continued)

(52) U.S. Cl.
CPC .............. *E21B 17/003* (2013.01); *C08K 3/08* (2013.01); *C08K 3/10* (2013.01); *C08K 3/22* (2013.01); *C08K 3/38* (2013.01); *C08K 3/40* (2013.01); *H01B 1/22* (2013.01); *C08K 3/04* (2013.01); *C08K 3/041* (2017.05); *C08K 3/042* (2017.05); *C08K 3/045* (2017.05);
(Continued)

(58) Field of Classification Search
CPC ......... E21B 17/003; H01B 3/18; H01B 7/046; H01B 1/22
See application file for complete search history.

(56) References Cited

U.S. PATENT DOCUMENTS 4,725,123 A * 2/1988 Anelli ................. G02B 6/4492
 385/100
6,673,400 B1 * 1/2004 Bedinger ................ C01B 3/501
 428/34.1

(Continued)

FOREIGN PATENT DOCUMENTS

WO    2012142129 A1    10/2012

OTHER PUBLICATIONS

International Search Report and Written Opinion for PCT/US2014/035840 dated Jan. 22, 2015.

*Primary Examiner* — Caroline N Butcher
(74) *Attorney, Agent, or Firm* — McGuireWoods LLP

(57) ABSTRACT

Composite cables suitable for use in conjunction with wellbore tools. One cable may include a polymer composite that includes dopants dispersed in a polymer matrix and continuous fibers extending along an axial length of the cable through the polymer matrix, wherein the cable is characterized by at least one of the following: (1) at least a portion of the cable having a density greater than about 2 g/cm3, wherein at least some of the dopants have a density of about 6 g/cm3 or greater, (2) at least a portion of the cable having a density less than about 2 g/cm3, wherein at least some of the dopants have a density of about 0.9 g/cm3 or less, (3) at least some of the dopants are ferromagnetic, or (4) at least some of the dopants are hydrogen getters.

20 Claims, 4 Drawing Sheets

(51) Int. Cl.
  *C08K 3/10*   (2018.01)
  *C08K 3/22*   (2006.01)
  *H01B 1/22*   (2006.01)
  *H01B 3/18*   (2006.01)
  *H01B 7/04*   (2006.01)
  *C08K 3/04*   (2006.01)
  *C08K 3/38*   (2006.01)
  *C08K 3/40*   (2006.01)

(52) U.S. Cl.
  CPC .......... *C08K 2003/085* (2013.01); *C08K 2003/0806* (2013.01); *C08K 2003/0831* (2013.01); *C08K 2003/0843* (2013.01); *C08K 2003/0856* (2013.01); *C08K 2003/0862* (2013.01); *C08K 2003/0887* (2013.01); *C08K 2003/387* (2013.01); *C08K 2201/001* (2013.01); *C08K 2201/01* (2013.01); *C08K 2201/011* (2013.01); *H01B 3/18* (2013.01); *H01B 7/046* (2013.01)

(56) References Cited

U.S. PATENT DOCUMENTS

| | | | |
|---|---|---|---|
| 6,772,840 B2 * | 8/2004 | Headworth | E21B 17/18 |
| | | | 166/302 |
| 7,054,529 B2 | 5/2006 | Bonicel | |
| 7,400,803 B2 | 7/2008 | Maida, Jr. | |
| 2001/0025664 A1 | 10/2001 | Quigley et al. | |
| 2006/0151194 A1 * | 7/2006 | Varkey | H01B 13/141 |
| | | | 174/102 R |
| 2006/0231286 A1 | 10/2006 | Varkey | |
| 2011/0234421 A1 * | 9/2011 | Smith | H01B 1/026 |
| | | | 340/854.3 |
| 2012/0298403 A1 | 11/2012 | Johnson | |

* cited by examiner

COMPOSITE CABLES

CROSS-REFERENCE TO RELATED APPLICATIONS

This application is a divisional of U.S. patent application Ser. No. 15/119,935 filed on Aug. 18, 2016 entitled "Composite Cables", which is a 371 international application of PCT/US2014/035840, filed Apr. 29, 2014 both of which are incorporated herein by reference.

BACKGROUND

The embodiments described herein relate to composite cables with additional properties or characteristics (e.g., increased or decreased density, ferromagnetism, and a hydrogen getter capability).

During various wellbore operations, wellbore tools may be deployed into and retrieved from a wellbore using a cable. Historically, such cables have included braided metal cables (e.g., entirely a braided metal cable or such a cable surrounding a core that contains electrical conductors or optical fibers). Cables are generally designed to exhibit sufficient strength to support the weight of a wellbore tool disposed at the end of the cable and the cable itself when running the wellbore tool through wellbore. However, because of the weight of the metal, at greater depths, the strength-to-weight ratio may become too low and cause the cable to fail (e.g., release the tool in the wellbore or sever into sections). To address the strength-to-weight ratio, cables have been produced with polymer composites, referred to as composite cables.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments described herein relate to composite cables with additional properties.

Figure 1:
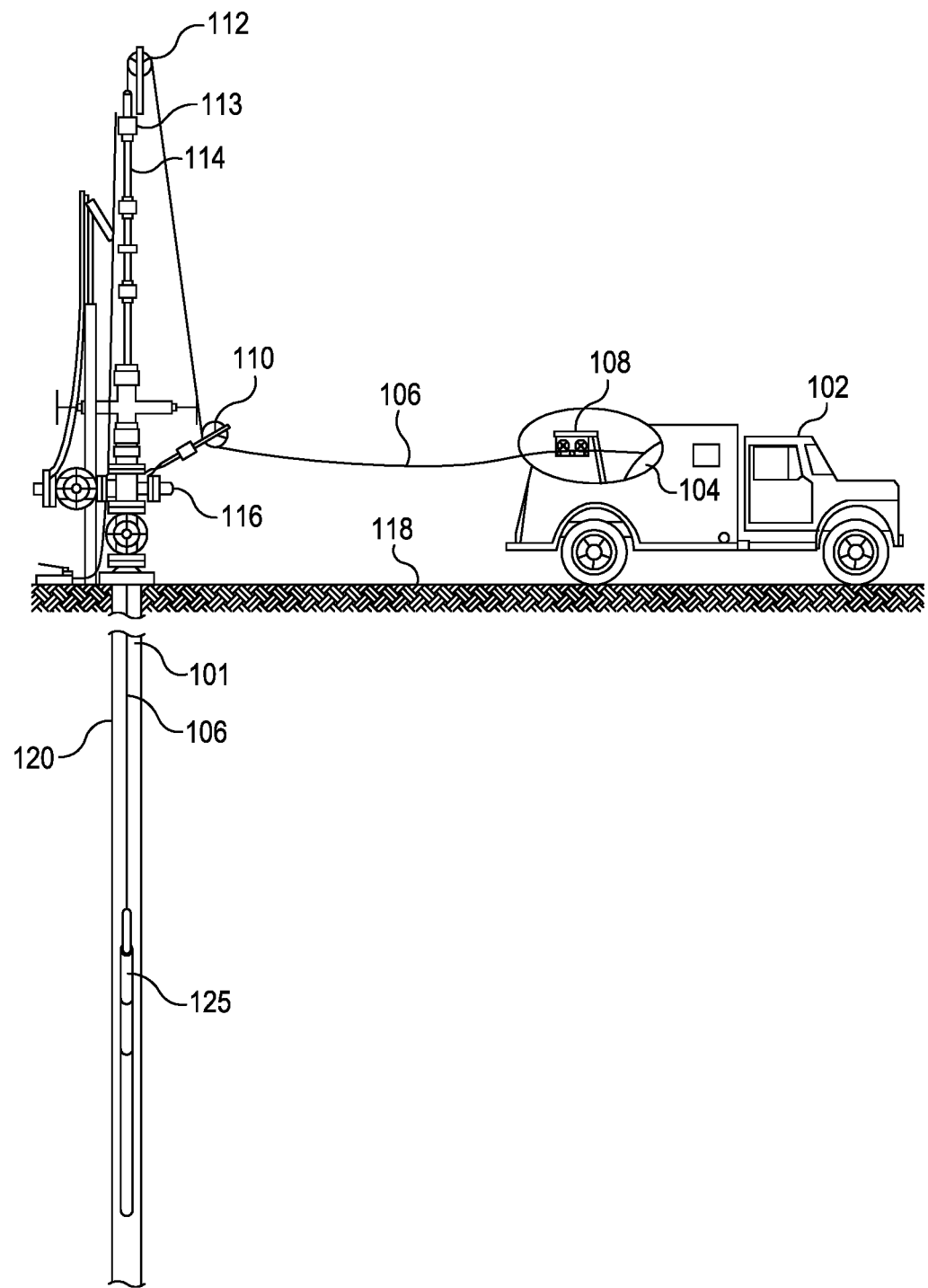
FIG. 1 illustrates an exemplary system for performing wellbore operations in a wellbore according to at least one embodiment described herein.

FIG. 1 illustrates an exemplary system for performing operations in a wellbore 101. As used herein, well operations include any wellbore intervention operation such as, but not limited to, logging, fishing, completions, and workover operations. A well services truck 102 may contain a number of different features, for example, for this application, the truck 102 contains drum 104, which spools off a composite cable 106 through a depth/weight indicator 108. The composite cable 106 may then be rigged through a lower sheave wheel 110, an upper sheave wheel 112, and a stuffing box 113 to pressure control equipment 114 where the composite cable 106 enters the wellbore 101 at well head connection 116. Below the surface 118, pipe or casing 120 extends through the wellbore 101. A well tool 125 may be connected to the composite cable 106 and disposed within the wellbore 101.

Figure 2B:
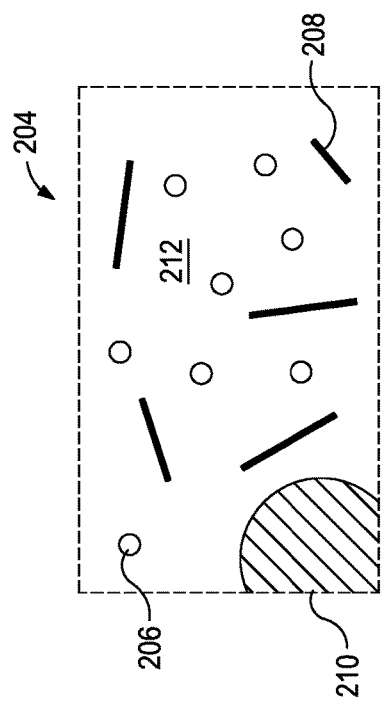
FIGS. 2B-D illustrate exemplary enlarged views of different compositions for the polymer composite of a composite cable.
Figure 2C:
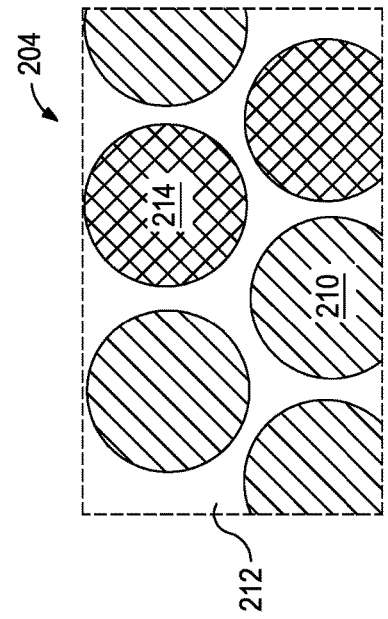
Figure 2A:
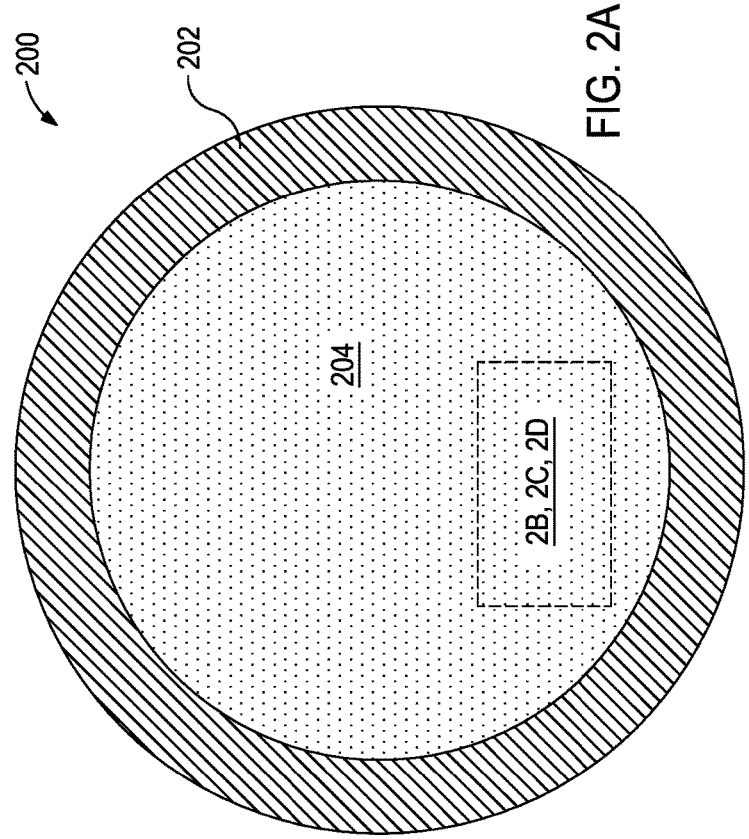
FIG. 2A illustrates a cross-sectional view of an exemplary composite cable according to at least one embodiment described herein.

FIG. 2A illustrates a cross-sectional view of an exemplary composite cable 200 according to at least one embodiment described herein. As illustrated, the composite cable 200 includes a sheath 202 disposed about a polymer composite 204. The composition of the polymer composite 204 may, in some instances, be designed to impart specific properties or characteristics to the composite cable 200 (e.g., increased or decreased density, ferromagnetism, and a hydrogen getter capability). The sheath 202 acts as a protective coating for the polymer composite 204 to mitigate damage to the polymer composite 204 or components thereof during operation. In some instances, however, the sheath 202 may be excluded from the composite cable 200.

Figure 2D:
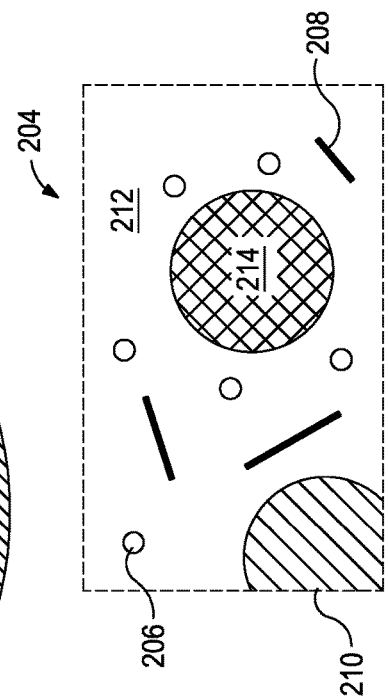

FIGS. 2B-2D illustrate exemplary enlarged views of different compositions for the polymer composite 204 that may provide for such properties or characteristics.

FIG. 2B illustrates the polymer composite 204 that includes continuous fibers 210 extending along the length of the composite cable 200 through a polymer matrix 212, which provides strength for the composite cable 200. Further, the polymer matrix 212 has dopants (illustrated as particles 206 and fibers 208) dispersed therein. As described further herein, the dopants may be used to modify or tailor the properties to the composite cable 200 (e.g., high-density dopants that increases the density of the composite cable 200). In some embodiments, dopants may include only particles, only fibers, or a combination of particles and fibers.

FIG. 2C illustrates the polymer composite 204 that includes at least two types of continuous fibers 210 and 214 extending along the length of the composite cable 200 and through the polymer matrix 212. The first continuous fibers 210 may be light-weight, high-strength fibers that contribute to the advantages of a composite cable 200 that exhibits a high strength-to-weight ratio. As described further herein, the second continuous fibers 214 may be used to modify or tailor the properties to the composite cable 200 (e.g., a heavier fiber that increases the density of the composite cable 200).

FIG. 2D illustrates the polymer composite 204 that is a hybrid of the foregoing embodiments. In some instances, the second continuous fibers 214 and the dopants (illustrated as particles 206 and fibers 208) may be used to enhance the same and/or different properties to the composite cable 200. For example, the second continuous fibers 214 and the dopants may both be selected to increase the density of the composite cable 200. In another example, the second continuous fibers 214 and the dopants may be selected to increase the density of the composite cable 200 and impart ferromagnetic properties (and optionally also increased density) to the composite cable 200, respectively.

In some instances, the continuous fibers 214, the short fibers 208, the particles 206, or any combination thereof may have a coating or a covering (not shown) disposed thereabout (e.g., a thermoplastic material, a thermoset material, a metal, an oxide, or the like). Such coatings or coverings may assist in adhesion of the continuous fibers 214, the short fibers 208, and the particles 206 with the polymer matrix 212.

In some embodiments, a composite cable described herein may include an energy conductor extending along the length of the composite cable. Energy conductors may be useful for power transmission downhole, communications between a wellbore tool and the surface, and a combination thereof. Exemplary energy conductors may include, but are not limited to, electrical conductor, optical fibers, and a combination thereof. The energy conductors may, in some embodiments, be configured as single conductors, stranded conductors, coaxial conductors, and any combination thereof.

Figure 3:
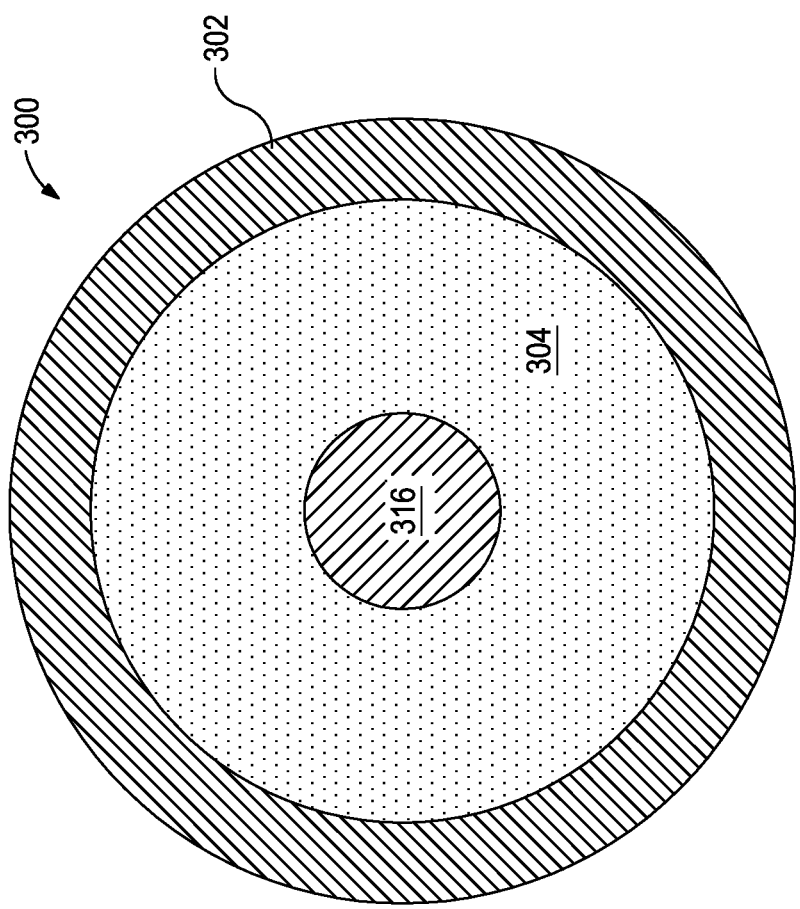
FIG. 3 illustrates a cross-sectional view of an exemplary composite cable according to at least one embodiment described herein.

FIG. 3 illustrates a cross-sectional view of an exemplary composite cable 300 according to at least one embodiment described herein. As illustrated, the composite cable 300 includes a sheath 302 disposed about a polymer composite 304 that is disposed about one or more energy conductors 316. In some instances, the energy conductors 316 may have a coating or a covering (not shown) disposed thereabout (e.g., a thermoplastic material, a thermoset material, a metal, an oxide, or the like). Such coatings or coverings may assist in adhesion of the energy conductors 316 with the polymer composite 304. Exemplary metals may include, but are not limited to, copper, platinum, gold, silver, nickel, iron, chromium, molybdenum, tungsten, stainless steel, zirconium, titanium, boron, indium, and the like, and any combination thereof. In some instances, an oxide of the metal (e.g., copper oxide or iron oxide) may provide a better chemical bond than the native metal. The thickness of the oxide layer may, in some instances, also influence the bond strength with the polymer composite 304. For example, if the oxide layer is too thin, then there may be insufficient material to create the bond. Whereas, if the oxide layer is too thick, then the oxide may become mechanically weak, which may lead to mechanical failure along the metal-oxide interface or within the oxide layer. In some instances, the thicknesses of a metal-oxide layer may be about 10 nm to about 100 nm.

A plurality of structural modifications may be applicable to the composite cables 200 and 300 of FIGS. 2 and 3, respectively, without departing from the scope of the disclosure. For example, two or more energy conductors 316 may be included. In another example, the energy conductors 316 may be radially-offset from a central axis of the composite cable 300. In yet another example, while depicted in FIGS. 2 and 3 as substantially circular, the cross-sectional shape of the composite cables 200, 300 may be non-circular (e.g., ovular, semicircular, semiovular, prolate, arcuate, polygonal, polygonal with rounded corners, and hybrids thereof). In another example, the composite cables 200, 300 may also be braided, helical, or twisted.

Non-limiting examples of materials suitable for use as the polymer matrix of the polymer composite may include thermoplastic or thermoset resins including polyolefins, polytetrafluoroethylene-perfluoromethylvinylether polymer ("PTFE-MFA"), perfluoro-alkoxyalkane polymer ("PFA"), polytetrafluoroethylene polymers ("PTFE"), ethylene-tetrafluoroethylene polymers ("ETFE"), ethylene-propylene copolymers ("EPC"), poly(4-methyl-1-pentene), other fluoropolymers, polyarylether ketone polymers ("PAEK"), polyetherether ketone ("PEEK"), polyphenylene sulfide polymers ("PPS"), modified polyphenylene sulfide polymers, polyether ketone polymers ("PEK"), maleic anhydride modified polymers, perfluoroalkoxy polymers, fluorinated ethylene propylene polymers, polyvinylidene fluoride polymers ("PVDF"), polytetrafluoroethylene-perfluoromethylvinylether polymers, polyamide polymers, polyurethane, thermoplastic polyurethane, ethylene chloro-trifluoroethylene polymers, chlorinated ethylene propylene polymers, self-reinforcing polymers based on a substituted poly(1,4-phenylene) structure where each phenylene ring has a substituent R group derived from a wide variety of organic groups, and the like, and any combination thereof.

Non-limiting examples of continuous fibers suitable for use in the polymer composite may include carbon fibers, silicon carbide fibers, aramid fibers, glass fibers, ceramic fiber, metal filaments, nanotubes, and the like, and any combination thereof. Metallic fibers and filaments may, in some instances, be composed of materials such as iron, aluminum, cobalt, nickel, tungsten, and the like, and any combination thereof.

In some embodiments, the continuous fibers running through and the dopants dispersed in the polymer matrix of the polymer composite may provide for at least one of: (1) increasing the composite cable density, (2) decreasing the composite cable density, (3) imparting a ferromagnetic quality to the composite cable (i.e., attracted to magnets), or (4) reducing degradation of the optical fiber(s). These properties may be imparted for the whole length of the composite cable or only a section of the composite cable. As used herein, the term "section of the composite cable" or derivations thereof refer to length sections of the composite cable and not portions of the composite cable like the sheath or the polymer composite. As used herein, the term "composite cable density" or derivations thereof refer to the density of the composite cable or a section thereof as a whole and not portions of the composite cable like the sheath or the polymer composite.

As a composite cable and attached wellbore tool are deployed in a wellbore, the weight of the wellbore tool along with gravitational forces or applied hydraulic pressure moves the wellbore tool through the wellbore. Because of the reduced weight of composite cables as compared to metal cables described above, the buoyancy of the composite cable may counteract the downhole movement, thereby limiting the depth to which a wellbore tool may be run. For composite cables, these buoyancy issues may be of greater concern when used in conjunction with vertical to 30° deviated wellbores and wellbore fluids with a weight (density) of about 12 ppg (1.4 g/cm$^3$) and greater (e.g., about 12 ppg to about 26 ppg, about 15 ppg to about 26 ppg, or about 18 ppg to about 26 ppg, including subsets therebetween).

In some embodiments, dopants, continuous fibers (e.g., second continuous fibers 214 of FIGS. 2C-D), or both may be used to achieve composite cable densities that are about the density of the fluid in the wellbore to about 3 times greater than the density of the fluid in the wellbore. In some embodiments, dopants, continuous fibers, or both may be used to achieve composite cable densities of greater than about 2 g/cm$^3$ (e.g., about 2 g/cm$^3$ to about 6 g/cm$^3$).

In some embodiments, dopants (e.g., particles or fibers) suitable for increasing the composite cable density may have a density greater than the composition of the polymer matrix, which, in some instances, is about 1 g/cm$^3$. In some embodiments, dopants suitable for increasing the composite cable density may have a density of about 6 g/cm$^3$ or greater. Non-limiting examples of dopants suitable for increasing the composite cable density may include nickel, tungsten, cobalt, copper, cupronickel, lead, molybdenum, gold, platinum, palladium, silver, brass, bismuth oxide, iron, steel, stainless steel, tantalum, and the like, and any combination thereof.

In some embodiments, continuous fibers suitable for increasing the composite cable density may have a density greater than the composition of the polymer matrix, which, in some instances, is about 1 g/cm$^3$. In some embodiments, continuous fibers suitable for increasing the composite cable density may have a density of about 6 g/cm$^3$ or greater. Non-limiting examples of continuous fibers suitable for increasing the composite cable density may include nickel, tungsten, cobalt, copper, cupronickel, lead, molybdenum, gold, platinum, palladium, silver, brass, bismuth oxide, iron, steel, stainless steel, tantalum, and the like, and any combination thereof.

In alternate embodiments, it may be preferable to have a composite cable with a density less than the density of wellbore fluid. For example, in extended reach horizontal wells, buoyant composite cables may reduce drag forces and allow a wellbore tool to reach greater depths. Without being limited by theory, it is believed that reducing the weight of the line may lower normal force with respect to the tubing, which may reduce drag forces.

In some embodiments, dopants may be used to achieve composite cable densities that are less than the density of the fluid in the wellbore to about half the density of the fluid in the wellbore. In some embodiments, dopants may be used to achieve composite cable densities of less than about 2 g/cm$^3$ (e.g., about 0.7 g/cm$^3$ to about 2 g/cm$^3$).

In some embodiments, dopants (e.g., particles or fibers) suitable for decreasing the composite cable density may have a density less than about 0.9 g/cm$^3$. Non-limiting examples of dopants suitable for decreasing the composite cable density may include hollow glass microspheres, cenospheres, gases (e.g., a foamed polymer matrix), borate, carbon, nanotubes, graphite, graphene, fullerenes, and the like, and any combination thereof.

In some instances, the density can be decreased by using a light weight continuous fibers, such as thermoset or thermoplastic fibers. In some instances, a polymer matrix may have an elongated void (or hollow portion) that provides for a decreased composite cable density. In some instances, the elongated void may run the length of the composite cable. In some instances, elongated voids may be included in the composite cable intermittently along the length of the composite cable.

In some embodiments, a composite cable or a section thereof may be ferromagnetic. As will be appreciated, this may prove useful in fishing operations where a magnetic fishing cable or the like is run into a wellbore to locate, capture, and/or retrieve the composite cable or section thereof. For example, in some instances, a ferromagnetic composite cable describe herein may sever while in a wellbore. Having the capability to be attracted to a magnet may allow for locating, capturing, and retrieving the severed section(s) of the composite cable.

Imparting a ferromagnetic property to a composite cable may, in some embodiments, be achieved by including a ferromagnetic dopant (e.g., particles or fibers), ferromagnetic continuous fibers, or both in the polymer matrix. Non-limiting examples of ferromagnetic dopants and ferromagnetic continuous fibers may include nickel, nickel alloys, cobalt, cobalt alloys, iron, iron alloys, steel, magnetite, hematite, Heusler alloys, and the like, and any combination thereof. In some instances, ferromagnetic dopants may be magnetic including being sized (e.g., micro- or nano-sized) so as to be superparamagnetic.

Hydrogen gas degrades optical fibers by darkening the glass, which interferes with the passage of light therethrough. In some embodiments, dopants may include hydrogen getters to mitigate such issues. Non-limiting examples of hydrogen getter dopants may include titanium, nickel, zirconium, niobium, and the like, and any combination thereof. Some hydrogen getters may be reactive with other compounds to form carbides and nitrides, which reduce their efficacy as hydrogen getters. In some instances to mitigate carbide and nitride formation, hydrogen getter dopants may include the foregoing metals coated with platinum or palladium. In some instances, continuous fibers of the foregoing hydrogen getters (e.g., nickel) may be utilized.

In some embodiments, combinations of dopants, combinations of continuous fibers, and combinations of both dopants and continuous fibers may be used to impart one or more of the foregoing properties or characteristics.

The extent to which dopants or continuous fibers impart any of the foregoing properties may be dependent on, inter alia, the concentration thereof and the properties thereof. For example, relative to increasing the composite cable density, dopants or continuous fibers with higher densities (e.g., tungsten) may be used in lower concentrations than dopants or continuous fibers with lower densities (e.g., nickel). In another example, ferromagnetic dopant that are magnetic may be used at lower concentrations than ferromagnetic dopants that are non-magnetic, so as to impart a ferromagnetic property without making the composite cable itself strongly magnetic.

In some embodiments, the concentration of dopants in a polymer composite may range from a lower limit of about 1 vol %, 5 vol %, or 10 vol % relative to the polymer composite to an upper limit of about 75 vol %, 50 vol %, 25 vol %, or 10 vol % relative to the polymer composite, and wherein the concentration of the dopant may range from any lower limit to any upper limit and encompass any subset therebetween.

In some embodiments, the concentration of continuous fibers (for imparting the additional properties described above) in the polymer composite may range from a lower limit of about 1 vol %, 5 vol %, or 10 vol % relative to the polymer composite to an upper limit of about 50 vol %, 25 vol %, or 10 vol % relative to the polymer composite, and wherein the concentration of the dopant may range from any lower limit to any upper limit and encompass any subset therebetween.

Non-limiting examples of materials suitable for use in the sheath may include polyolefins, PTFE-MFA, PFA, PTFE, ETFE, EPC, poly(4-methyl-1-pentene), other fluoropolymers, PAEK, PEEK, PPS, modified polyphenylene sulfide polymers, PEK, maleic anhydride modified polymers, perfluoroalkoxy polymers, fluorinated ethylene propylene polymers, PVDF, polytetrafluoroethylene-perfluoromethylvinylether polymers, polyamide polymers, polyurethane, thermoplastic polyurethane, ethylene chloro-trifluoroethylene polymers, chlorinated ethylene propylene polymers, self-reinforcing polymers based on a substituted poly(1,4-phenylene) structure where each phenylene ring has a substituent R group derived from a wide variety of organic groups, and the like, and any combination thereof. In some instances, these materials alone may not have sufficient mechanical and wear properties to withstand high pull or compressive forces as the composite cable is pulled, for example, through the stuffing box when running the composite cable into the wellbore. As such, the sheath material may, in some embodiments, further include short fibers to increase the mechanical and wear properties. While any suitable fibers may be used to provide properties sufficient to withstand such forces, exemplary fibers may include, but are not limited to, carbon fibers, fiberglass, ceramic fibers, aramid fibers, liquid crystal aromatic polymer fibers, quartz, carbon nanotubes, and the like, and any combination thereof.

Figure 4:
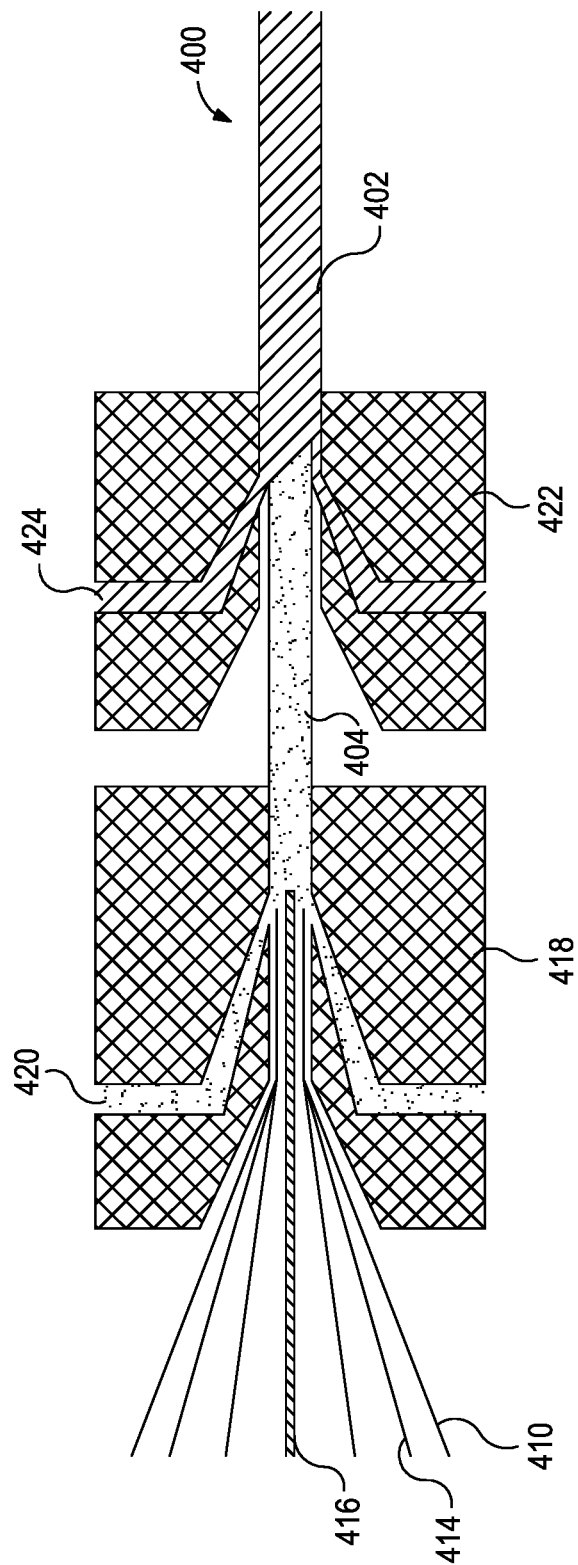
FIG. 4 illustrates a system that may be used to produce composite cables according to at least one embodiment described herein.

The various embodiments of a composite cable described herein may be produced by any known methods. FIG. 4 illustrates a system that may, in some embodiments, be used to produce one or more of the embodiments of the composite cable described herein. Specifically, FIG. 4 illustrates the production of a composite cable 400 similar to that of FIG. 3 having a polymer composite similar to that of FIG. 2D. One or more energy conductors 416 and continuous fibers 410,414 may be fed into a first extruder 418 where the continuous fibers 410,414 are disposed about the energy conductors 416. In some instances, the energy conductors 416 may have a covering (not shown) disposed thereabout. In the first extruder 418, a polymer composite melt 420 (e.g., a melt that includes the polymer matrix described herein with dopants dispersed therein) may be extruded about the continuous fibers 410,414 and energy conductors 416 to form a polymer composite 404 with the continuous fibers 410,414 embedded therein. Then, a second extruder 422 may be used to extrude a second polymer melt 424 into a sheath 402 about the polymer composite 404, thereby forming a composite cable 400 described herein.

The equipment and process of FIG. 4 may be modified to achieve other configurations of composite cables described herein. For example, the second extruder may be excluded for composite cables that do not include a sheath.

Further, other equipment and/or processes may be included in production to composite cables described herein to cure or harden the various polymer melts, to shape the cross-section of the composite cable, and the like. For example, a polymer melt described herein may include a thermoset resin that is partially crosslinked and may optionally include additional catalyst or crosslinker. In some instances, the partially crosslinked resin may be crosslinked to a greater degree via heat, pressure, strain, light, microwaves, shock, time, or any other stimulus in additional processing steps/apparatuses. In some embodiments, heat may be applied directly to the dopants or to the fibers via electromagnetic radiation.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Embodiments disclosed herein include:

A. a cable that includes a polymer composite that includes dopants dispersed in a polymer matrix and continuous fibers extending along an axial length of the cable through the polymer matrix, wherein the cable is characterized by at least one of the following: (1) at least a portion of the cable having a density greater than about 2 $g/cm^3$, wherein at least some of the dopants have a density of about 6 $g/cm^3$ or greater, (2) at least a portion of the cable having a density less than about 2 $g/cm^3$, wherein at least some of the dopants have a density of about 0.9 $g/cm^3$ or less, (3) at least some of the dopants are ferromagnetic, or (4) at least some of the dopants are hydrogen getters;

B. a method that includes running a wellbore tool into a wellbore having a wellbore fluid disposed therein, the wellbore tool being coupled to an end of a cable according to Embodiment A;

C. a system that includes a stuffing box coupled to a pressure control equipment connected to a wellbore at a well head connection; a cable according to Embodiment A rigged through the stuffing box, the pressure control equipment, and the well head connection and extending into the wellbore; a wellbore tool disposed in the wellbore and coupled to the cable;

D. a polymer composite that includes first continuous fibers and second continuous fibers extending along an axial length of the cable through a polymer matrix, wherein the cable is characterized by at least one of the following: (1) at least a portion of the cable having a density greater than about 2 $g/cm^3$, wherein at least some of the second continuous fibers have a density of about 6 $g/cm^3$ or greater, (2) at least a portion of the cable having a density less than about 2 $g/cm^3$, wherein at least some of the second continuous fibers have a density of about 0.9 $g/cm^3$ or less, (3) at least some of the second continuous fibers are ferromagnetic, or (4) at least some of the second continuous fibers are hydrogen getters;

E. a method that includes running a wellbore tool into a wellbore having a wellbore fluid disposed therein, the wellbore tool being coupled to an end of a cable according to Embodiment D; and F. a system that includes a stuffing box coupled to a pressure control equipment connected to a wellbore at a well head connection; a cable according to Embodiment D rigged through the stuffing box, the pressure control equipment, and the well head connection and extending into the wellbore; a wellbore tool disposed in the wellbore and coupled to the cable.

Each of embodiments A, B, C, D, E, and F may have one or more of the following additional elements in any combination: Element 1: wherein the cable further comprises an energy conductor and the polymer composite is disposed about the energy conductor; Element 2: wherein the cable further comprises a sheath disposed about the polymer composite; Element 3: wherein the density of the portion of the cable is greater than about 2 $g/cm^3$, and wherein at least some of the dopants (or second continuous fibers) include at least one selected from the group consisting of: nickel, tungsten, cobalt, copper, cupronickel, lead, molybdenum, gold, platinum, palladium, silver, brass, bismuth oxide, iron, steel, stainless steel, tantalum, and any combination thereof;

Element 4: wherein the density of the portion of the cable is less than about 2 g/cm³, and wherein at least some of the dopants include at least one selected from the group consisting of: hollow glass microspheres, cenospheres, gases, a borate, carbon, nanotubes, graphite, graphene, fullerenes, and any combination thereof; Element 5: wherein at least some of the dopants (or second continuous fibers) are ferromagnetic, and wherein at least some of the dopants include at least one selected from the group consisting of: nickel, a nickel alloy, cobalt, a cobalt alloy, iron, an iron alloy, steel, magnetite, hematite, a Heusler alloy, and any combination thereof; Element 6: wherein at least some of the dopants (or second continuous fibers) are magnetic; Element 7: wherein at least some of the dopants are superparamagnetic; Element 8: wherein at least some of the dopants (or second continuous fibers) are hydrogen getters, and wherein at least some of the dopants (or second continuous fibers) include at least one selected from the group consisting of: titanium, nickel, zirconium, niobium, and any combination thereof; Element 9: wherein at least some of the dopants (or second continuous fibers) are hydrogen getters, and wherein at least some of the dopants (or second continuous fibers) include at least one selected from the group consisting of: titanium, nickel, zirconium, niobium, and any combination thereof coated with at least one selected from the group consisting of: platinum, palladium, and any combination thereof; Element 10: wherein at least some of the dopants are fibers; Element 11: wherein the polymer composite includes dopants (or second continuous fibers) at about 1 vol % to about 75 vol % relative to the polymer matrix; and Element 12: a wellbore tool connector (e.g., a rope socket) coupled to the cable.

By way of non-limiting example, exemplary combinations applicable to A, B, C, D, E, and F include: Element 1 and 2 in combination and optionally also in combination with at least one of Elements 5-11; Element 3 in combination with at least one of Elements 5-11; Element 4 in combination with at least one of Elements 5-11; Element 1 and/or 2 in combination with Element 3 and optionally at least one of Elements 5-11; Element 1 and/or 2 in combination with Element 4 and optionally at least one of Elements 5-11; and at least two of at least one of Elements 5-11 in combination optionally in combination with Element 1 or 2. Additionally, exemplary combinations applicable to B and E also include: Element 3 in combination with Element 13 and Element 4 in combination with Element 12.

Embodiments disclosed herein also include:

G. a method that includes running a wellbore tool into a wellbore having a wellbore fluid disposed therein, the wellbore tool being coupled to an end of a cable that comprises a polymer composite that includes dopants dispersed in a polymer matrix and continuous fibers extending along an axial length of the cable through the polymer matrix, wherein at least a portion of the cable having a density greater than a wellbore fluid density, and wherein at least some of the dopants have a density of about 6 g/cm³ or greater.

H. a method that includes running a wellbore tool into a wellbore having a wellbore fluid disposed therein, the wellbore tool being coupled to an end of a cable that comprises a polymer composite that includes dopants dispersed in a polymer matrix and continuous fibers extending along an axial length of the cable through the polymer matrix, wherein at least a portion of the cable having a density less than a wellbore fluid density, and wherein at least some of the dopants have a density of about 0.9 g/cm³ or less.

Each of embodiments G and H may have one or more of the following additional elements in any combination: Element 12: wherein the wellbore fluid is about 12 ppg or less; Element 13: wherein the wellbore fluid is about 12 ppg or greater; Element 14: wherein the wellbore fluid is about 15 ppg or less; Element 15: wherein the wellbore fluid is about 15 ppg or greater; and Element 16: wherein the wellbore fluid is up to about 26 ppg.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The invention claimed is:

1. A method comprising:
running a wellbore tool into a wellbore having a 12 ppg or greater wellbore fluid disposed therein, the wellbore tool being coupled to an end of a cable that includes a polymer composite that includes dopants dispersed in a polymer matrix and continuous fibers distributed through and contacting the polymer matrix, the continuous fibers also extending along an axial length of the cable through the polymer matrix; and wherein the cable is characterized by at least one of the following:
(1) a first portion of the cable having a density greater than about 2 g/cm3, wherein a first portion of the dopants have a density of about 6 g/cm3 or greater, (2) a second portion of the cable having a density less than about 2 g/cm3, wherein a second portion of the dopants have a density of about 0.7 g/cm3 or less, (3) at least some of the dopants are ferromagnetic, and (4) at least some of the dopants are hydrogen getters.

2. The method of claim 1, wherein the cable further comprises an energy conductor and the polymer composite is disposed about the energy conductor.

3. The method of claim 1, wherein the cable further comprises a sheath disposed about the polymer composite.

4. The method of claim 1, wherein at least some of the dopants include at least one selected from the group consisting of: nickel, tungsten, cobalt, copper, cupronickel, lead, molybdenum, gold, platinum, palladium, silver, brass, bismuth oxide, iron, steel, stainless steel, tantalum, and any combination thereof.

5. The method of claim 1, wherein at least some of the dopants are ferromagnetic.

6. The method of claim 1, wherein at least some of the dopants are hydrogen getters.

7. A system comprising:

a stuffing box coupled to a pressure control equipment connected to a wellbore at a well head connection;

a cable rigged through the stuffing box, the pressure control equipment, and the well head connection and extending into the wellbore;

a wellbore tool disposed in the wellbore and coupled to the cable; and wherein the cable includes a polymer composite that includes dopants dispersed in a polymer matrix and continuous fibers distributed through and contacting the polymer matrix, the continuous fibers also extending along an axial length of the cable through the polymer matrix; and wherein the cable is characterized by at least one of the following:

(1) a first portion of the cable having a density greater than about 2 g/cm3, wherein a first portion of the dopants have a density of about 6 g/cm3 or greater, (2) a second portion of the cable having a density less than about 2 g/cm3, wherein a second portion of the dopants have a density of about 0.7 g/cm3 or less, (3) at least some of the dopants are ferromagnetic, and (4) at least some of the dopants are hydrogen getters.

8. The system of claim 7, wherein the cable further comprises an energy conductor and the polymer composite is disposed about the energy conductor.

9. The system of claim 7, wherein the cable further comprises a sheath disposed about the polymer composite.

10. The system of claim 7, wherein the density of the portion of the cable is greater than about 2 g/cm3, and wherein at least some of the dopants include at least one selected from the group consisting of: nickel, tungsten, cobalt, copper, cupronickel, lead, molybdenum, gold, platinum, palladium, silver, brass, bismuth oxide, iron, steel, stainless steel, tantalum, and any combination thereof.

11. The system of claim 7, wherein the density of the portion of the cable is less than about 2 g/cm3, and wherein at least some of the dopants include at least one selected from the group consisting of: hollow glass microspheres, cenospheres, gases, a borate, carbon, nanotubes, graphite, graphene, fullerenes, and any combination thereof.

12. The system of claim 7, wherein at least some of the dopants are ferromagnetic.

13. The system of claim 12, wherein at least some of the dopants include at least one selected from the group consisting of: nickel, a nickel alloy, cobalt, a cobalt alloy, iron, an iron alloy, steel, magnetite, hematite, a Heusler alloy, and any combination thereof.

14. The system of claim 7, wherein at least some of the dopants are magnetic.

15. The system of claim 7, wherein at least some of the dopants are superparamagnetic.

16. The system of claim 7, wherein at least some of the dopants are hydrogen getters.

17. The system of claim 16, wherein at least some of the dopants include at least one selected from the group consisting of: titanium, nickel, zirconium, niobium, and any combination thereof.

18. The system of claim 7, wherein at least some of the dopants are hydrogen getters, and wherein at least some of the dopants include at least one selected from the group consisting of: titanium, nickel, zirconium, niobium, and any combination thereof coated with at least one selected from the group consisting of: platinum, palladium, and any combination thereof.

19. The system of claim 7, wherein at least some of the dopants are fibers.

20. The system of claim 7, wherein the polymer composite includes dopants at about 1 vol % to about 75 vol % relative to the polymer matrix.

* * * * *